United States Patent
Im et al.

(10) Patent No.: US 7,702,130 B2
(45) Date of Patent: Apr. 20, 2010

(54) USER INTERFACE APPARATUS USING HAND GESTURE RECOGNITION AND METHOD THEREOF

(75) Inventors: Sung-Ho Im, Daejon (KR); Dong-Sun Lim, Daejon (KR); Tae-Joon Park, Seoul (KR); Kee-Koo Kwon, Daejon (KR); Man-Seok Yang, Daejon (KR); Heung-Nam Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1207 days.

(21) Appl. No.: 11/239,821

(22) Filed: Sep. 29, 2005

(65) Prior Publication Data

US 2006/0136846 A1 Jun. 22, 2006

(30) Foreign Application Priority Data

Dec. 20, 2004 (KR) .................... 10-2004-0108964

(51) Int. Cl.
*G06K 9/00* (2006.01)
(52) U.S. Cl. ..................................... 382/103
(58) Field of Classification Search .................. 382/103
See application file for complete search history.

(56) References Cited

U.S. PATENT DOCUMENTS

| 5,933,152 A * | 8/1999 | Naruki et al. ............... 345/501 |
| 6,043,805 A * | 3/2000 | Hsieh ........................ 345/158 |
| 6,147,678 A * | 11/2000 | Kumar et al. ............... 345/158 |
| 6,477,239 B1 | 11/2002 | Ohki et al. |
| 6,564,144 B1 * | 5/2003 | Cherveny ................... 701/208 |
| 6,766,036 B1 * | 7/2004 | Pryor ......................... 382/103 |
| 7,010,160 B1 * | 3/2006 | Yoshida ...................... 382/162 |
| 7,050,606 B2 * | 5/2006 | Paul et al. ................... 382/104 |
| 7,289,645 B2 * | 10/2007 | Yamamoto et al. .......... 382/104 |
| 2004/0193413 A1 * | 9/2004 | Wilson et al. ............... 704/243 |

FOREIGN PATENT DOCUMENTS

| JP | 2002-182680 | 6/2002 |
| JP | 2002-236534 | 8/2002 |
| KR | 1999-0046908 | 7/1999 |
| KR | 1999-0046909 | 7/1999 |
| KR | 10-2000-0032308 A | 6/2000 |
| KR | 10-2003-0030232 A | 4/2003 |
| KR | 2003-0037692 | 5/2003 |
| WO | WO 99/34276 | 7/1999 |

* cited by examiner

*Primary Examiner*—Tom Y Lu
(74) *Attorney, Agent, or Firm*—Blakely, Sokoloff, Taylor & Zafman

(57) ABSTRACT

Provided is a user interface apparatus that can control a telematics terminal safely and comfortably while driving, by recognizing a hand gesture image received through a camera in the telematics terminal as a corresponding control signal, and a method thereof. The interface apparatus using a hand gesture recognition, includes: an input receiving block for receiving a command registration request signal and a command selection signal; a hand gesture recognizing block for storing the hand gesture image in connection with a specific command, and transforming the hand gesture image into the corresponding command by recognizing the hand gesture image from the image obtained in the image obtaining block; and a command performing block for performing an operation corresponding to a command transformed in the hand gesture recognizing block.

10 Claims, 5 Drawing Sheets

USER INTERFACE APPARATUS USING HAND GESTURE RECOGNITION AND METHOD THEREOF

FIELD OF THE INVENTION

The present invention relates to a user interface apparatus using a hand gesture recognition and a method thereof; and, more particularly, to a user interface apparatus that can control a telematics terminal safely and comfortably while driving, by recognizing a hand gesture image received through a camera in the telematics terminal as a corresponding control signal, and a method thereof.

DESCRIPTION OF RELATED ART

Recently, cars are equipped with various devices as cars are improved in quality and a function. That is, the devices are getting complicated, as electronic devices such as a compact disk (CD) and a television (TV) are added to a typical stereo. In addition, various sensors including a camera are attached according to mounting of a car navigation system (CNS) adopting a Global Positioning System (GPS) and a Geographic Information System (GID).

In particular, a telematics technology development providing various services such as an automatic accident report, an emergency service call and a road guidance service to a driver through a terminal in a car are activated by integrating a mobile communication technology, a global positioning technology, a map information technology and an automobile device control technology.

As the function of telematics service is diversified and complicated, it becomes difficult to control a telematics terminal by only a general button operation. Furthermore, considering that most telematics services are used while driving, an interface that can be operated easily is required more.

Meanwhile, input can be made in a user interface by speech recognition or a touchscreen which are used or tried in a portable computer except a button or a keypad. However, the speech recognition has a problem that a speech recognition rate is very low, since the environment where the telematics terminal is used is not in a good condition due to noise, radio sound and talking with fellow passengers. There is also a problem that it may cause discomfort to a passenger since it is controlled by a speech.

Meanwhile, the touchscreen is very useful in a mobile terminal such as a personal digital assistance (PDA). However, since the telematics terminal is mainly used while driving, the touchscreen requiring a close observation is not proper as a user interface of the telematics terminal.

Therefore, required is the user interface which can be controlled easily and does not interrupt driving in conforming to the characteristics of the telematics terminal used while driving.

SUMMARY OF THE INVENTION

It is, therefore, an object of the present invention to provide a user interface apparatus using a hand gesture recognition that can control a telematics terminal safely and comfortably while driving, by recognizing a hand gesture image received through a camera in the telematics terminal as a corresponding control signal, and a method thereof.

Other objects and aspects of the invention will be understood by the following description and become more apparent from the embodiments in accordance with the present invention, which is set forth hereinafter. It will be also apparent that objects and aspects of the invention can be embodied easily by the means and combinations thereof defined in the claims.

In accordance with an aspect of the present invention, there is provided an interface apparatus using a hand gesture recognition, including: an input receiving block for receiving a command registration request signal and a command selection signal; a hand gesture recognizing block for storing the hand gesture image, which is obtained in the image obtaining block according to the command registry request signal received in the input receiving block, in connection with a specific command, and transforming the hand gesture image into the corresponding command by recognizing the hand gesture image from the image obtained in the image obtaining block; and a command performing block for performing an operation corresponding to a command transformed in the hand gesture recognizing block.

In accordance with another aspect of the present invention, there is provided an interface apparatus using a hand gesture recognition, including steps of: outputting an available command list upon a command registration request signal, receiving a selection for a specific command, receiving the hand gesture image to correspond to the selected command, and registering the image to a gesture information database (DB); recognizing the hand gesture image obtained from a camera and transforming the image into the corresponding command; and performing the operation corresponding to the transformed command.

The present invention suggests a user interface using a hand gesture to make it easy to control the telematics terminal by a driver. That is, the present invention recognizes the hand gesture image data obtained from a camera, transforms the data into a corresponding command, processes the transformed command, and outputs the process result through a monitor and a speaker. Herein, the command corresponding to a hand gesture is made to be used by registering to meet a user's taste and a learning function is used to recognize properly to the user's characteristic.

Other objects and aspects of the invention will become apparent from the following description of the embodiments with reference to the accompanying drawings. Therefore, those skilled in the art that the present invention is included can embody the technological concept and scope of the invention easily. In addition, if it is considered that detailed description on the prior art may blur the point of the present invention, the detailed description will not be provided herein.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
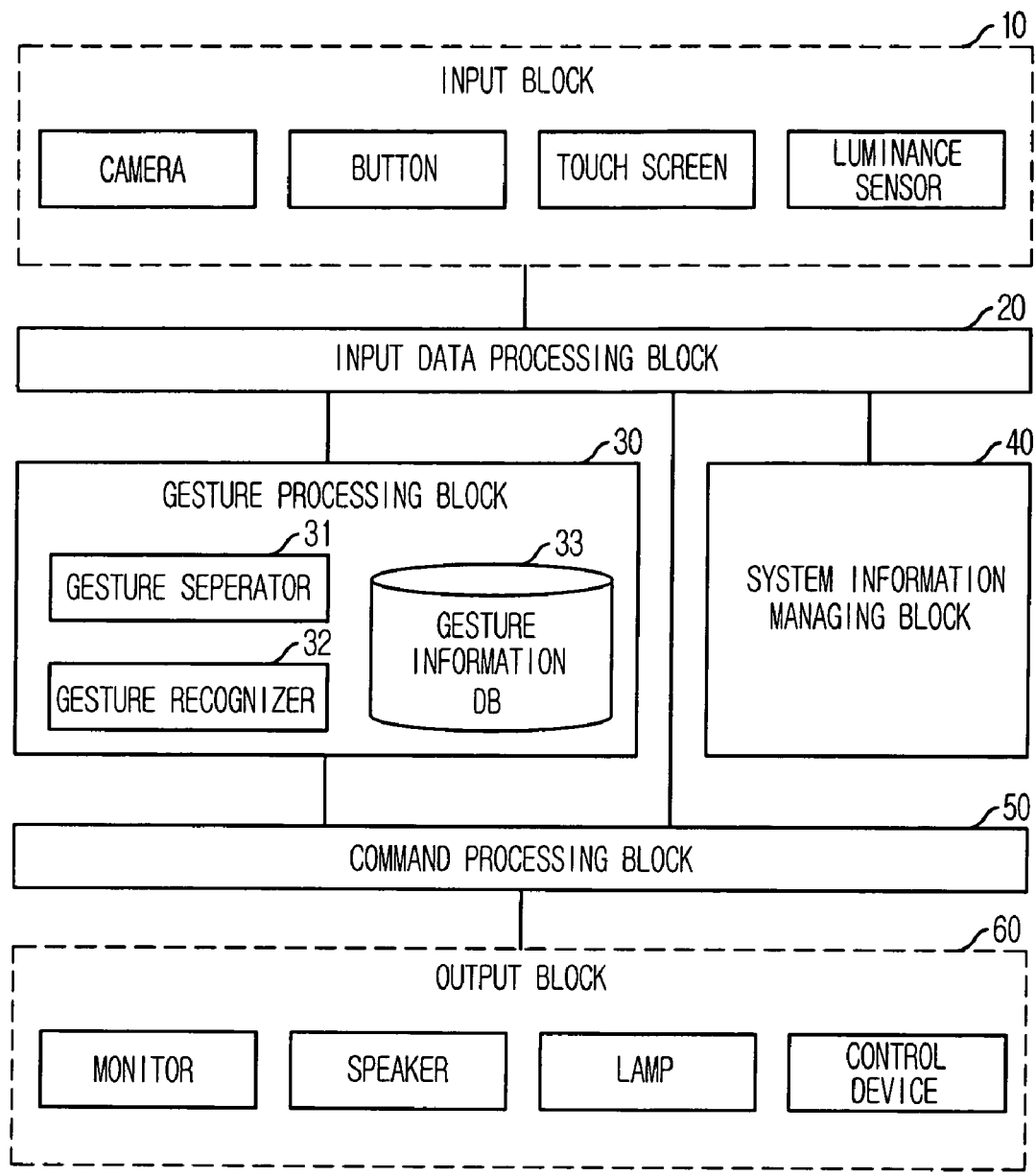
FIG. 1 is a block diagram showing a user interface apparatus using a hand gesture recognition in accordance with an embodiment of the present invention.

FIG. 1 is a block diagram showing a user interface apparatus using a hand gesture recognition in accordance with an embodiment of the present invention.

As shown in FIG. 1, the user interface device using a hand gesture recognition includes an input block 10, an input data processing block 20, a gesture processing block 30, a system information managing block 40, a command processing block 50 and an output block 60.

The input block 10 includes a camera 11, a button 12, a touch screen 13 and a luminance sensor 14. The camera provides a general image photographing function, in particular, photographs a hand gesture image and transmits the image to the input data processing block 20.

The input data processing block 20 collects image data of hand gesture from the camera 11, a button input signal of a hot key form from the button 12 and a key input signal from the touch screen 13, which is a letter input signal using a software keyboard. Also, the input data processing block 20 collects a luminance sensing signal from the luminance sensor 14.

The input data processing block 20 preprocesses the collected image data, the button input signal, the key input signal and the luminance sensing signal and transmits them into the gesture processing block 30, the system information managing block 40, and the command processing block 50 according to the input contents. That is, the input data processing block 20 transmits the image data collected from the camera 11 to the gesture processing block 30, the input signal collected from the button 12 and the touchscreen 13 to the gesture processing block 30 or the command processing block 50, and the luminance sensing signal collected from the luminance sensor 14 to the command processing block 50.

The gesture processing block 30 is a module that processes the image data of the hand gesture obtained through the camera 11, and a gesture separator 31 separates a command input frame including a hand gesture that can be recognized as an independent command from the image transmitted from the input data processing block 20. Herein, the method separating the command input frame includes steps of extracting a hand image from the image received from the input data processing block 20 at a pre-determined period for an effective recognition, for instance, within a half of the least input time of the hand gesture, and when there is no change in comparison with a former frame, separating the extracted hand image as a command input frame. The process separating the hand gesture image from the whole image is very effective since it can recognize a limited command quickly and exactly.

Figure 6:
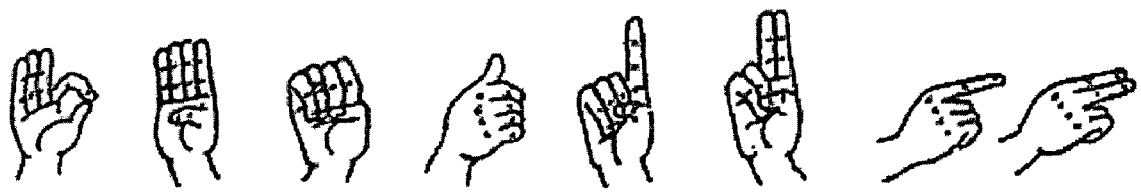
FIG. 6 is an illustration showing a hand gesture in a user interface device using a hand gesture recognition with an embodiment of the present invention.

Meanwhile, the command input frame separated as an image including the hand gesture from the gesture separator 31 is transmitted to the gesture recognizer 32. Subsequently, the gesture recognizer 32 extracts feature points from the command input frame received from the gesture separator 31, recognizes the hand gesture by using a gesture information database (DB) 33, and transforms the recognized hand gesture into a corresponding command. Herein, the gesture information DB 33 is built by learning with the data inputted directly by a user to exactly recognize different gestures for each other. For example, a hand shape capable of inputting a command can be formed as shown in FIG. 6, and it is also possible to set up a command by combining various hand shapes and the forms of the more than two hand shapes.

The command processing block 50 performs an operation corresponding to the command received from the gesture processing block 30. To perform the operation, the operation to be performed according to each command, e.g., a radio on/off and a lamp on/off, should be stored in a database. That is, the command processing block 50 interprets the command or the input signal received from the gesture processing block 30 or the input data processing block 20 and performs a corresponding operation. The operation result is outputted through the output block 60, or comes out in a form that controls the controlling block 60. The output block 60 includes a monitor for displaying an input command message, a speaker for notifying an input condition with speech or a beeping sound, a lamp for controlling lighting, a radio, a TV and an air conditioner for control.

The command processing block 50 checks if the luminance sensing signal received from the luminance sensor 14, which is the present luminance, is less than a pre-set value, and if yes, a lamp in a car is controlled to be turned on.

The system information managing block 40 stores user information and environment setup data in the system information DB to be used in the gesture processing block 30.

Whole operation procedures will be described in detail referring to FIG. 2.

Figure 2:
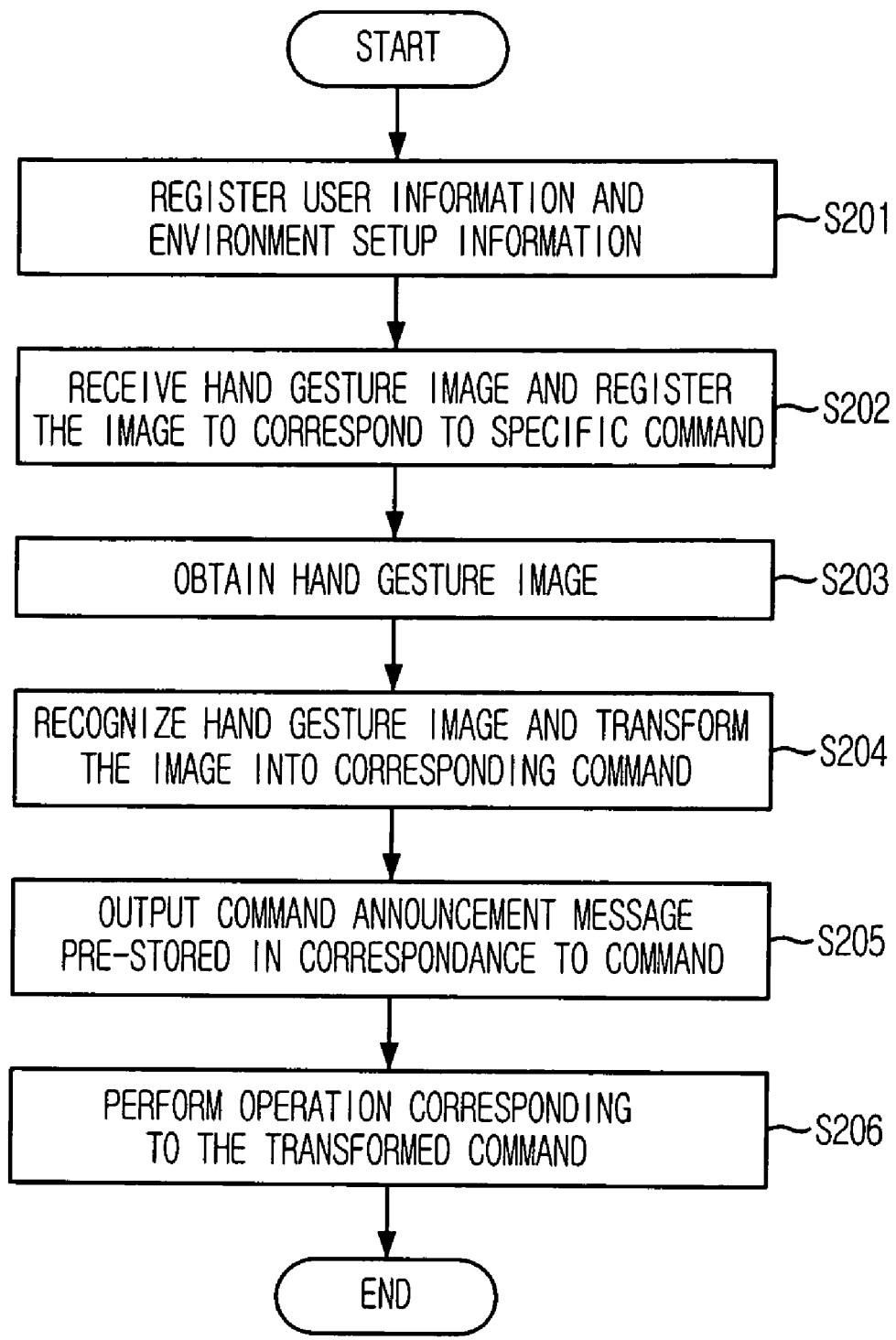
FIG. 2 is a flowchart showing a user interface method using a hand gesture recognition in accordance with an embodiment of the present invention.

FIG. 2 is a flowchart showing a user interface method using a hand gesture recognition in accordance with an embodiment of the present invention.

At step S201, the user information and the environment setup data are received and registered in a system information managing block 40. Herein, a code for identifying a user is included in the user registration information, and a presence of a speaker/monitor output and timeout time are included in the environment setup data.

At step S202, a specific command is selected by outputting an available command list according to a command registration request signal received through the button 12 or the touchscreen 13, and the hand gesture image corresponding to the selected command is registered in the gesture information DB after received through the camera 11.

Herein, there are commands for controlling a function which is frequently used in a car, e.g., a speaker sound increase/decrease, a radio on/off, an indoor lamp on/off and a navigation on/off.

Meanwhile, when the command and the hand gesture image are stored corresponding to each other, it is possible to receive a command announcement message to be outputted when the command is executed and store it together. For example, a bell sound is outputted when a command is to be inputted, a hand gesture is received by outputting a message 'Input a hand gesture command?', in a monitor. In case that the speaker volume is increased as a result of recognizing the received hand gesture, a command announcement message 'A volume increases', is outputted through the monitor and the speaker, which makes a user aware of the command input condition easily. A command registration process described above will be described in detail hereinafter with reference to FIG. 3.

At step S203, if the hand gesture image is obtained through the camera 11, at step S204, the obtained hand gesture image is recognized and transformed into a corresponding command. That is, feature points of the hand gesture image obtained through the camera 11 and the hand gesture image stored in the gesture information DB are compared with each other and a matched hand gesture image is searched. The procedure will be described in detail referring to FIG. 4.

At step S205, if the hand gesture image obtained through the camera 11 is recognized as a corresponding command, the command announcement message which is pre-registered with respect to the transformed command is outputted from the gesture information DB, and at step S206, the operation which is pre-set with respect to the transformed command is performed.

Figure 3:
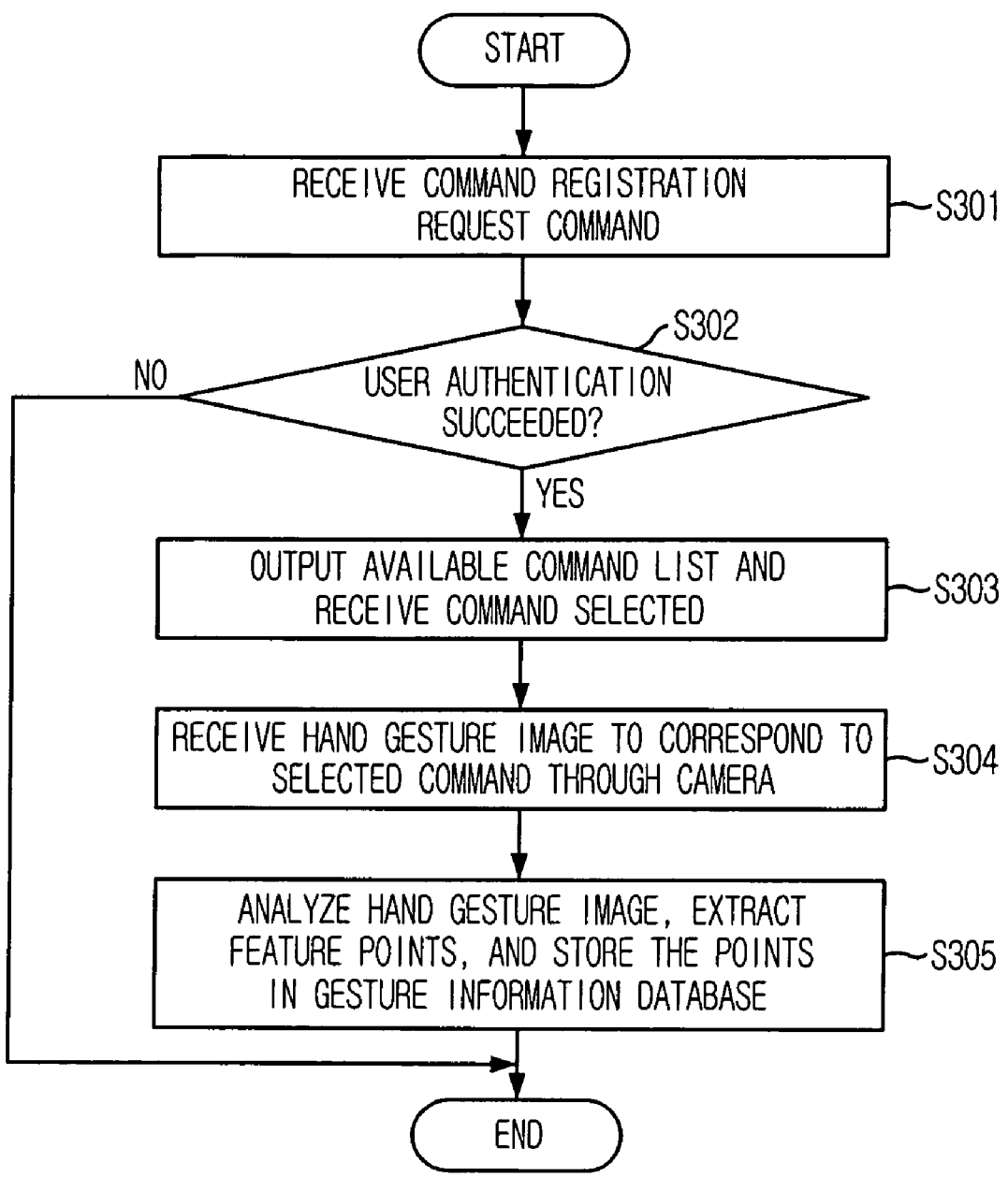
FIG. 3 is a flowchart illustrating a command registration procedure of a user interface method using a hand gesture recognition in accordance with an embodiment of the present invention.

FIG. 3 is a flowchart illustrating a command registration procedure of a user interface method using a hand gesture recognition in accordance with an embodiment of the present invention.

At step S301, a command request command is received through the button 12 or the touchscreen 13 and at step S302, a user code is checked to authenticate if the user is registered. At step S303, if a user is authenticated, an available command list is outputted and a command is selected. At step S304, the hand gesture image corresponding to the selected command is received through the camera 11. Herein, the command announcement message guiding a command function is pre-set in each command.

At step S305, feature points extracted by analyzing the received hand gesture image are stored in the gesture information DB. Herein, the feature points include information regarding the size and shape of a hand, a fist and a finger of a user, and information regarding the number of unfolded fingers and the direction of a finger for identifying a command to raise the recognition rate of hand gesture.

Meanwhile, if the command input is completed, the learning is performed to recognize exactly based on the extracted information, and the information regarding a learning result is stored in the gesture information DB.

Figure 4:
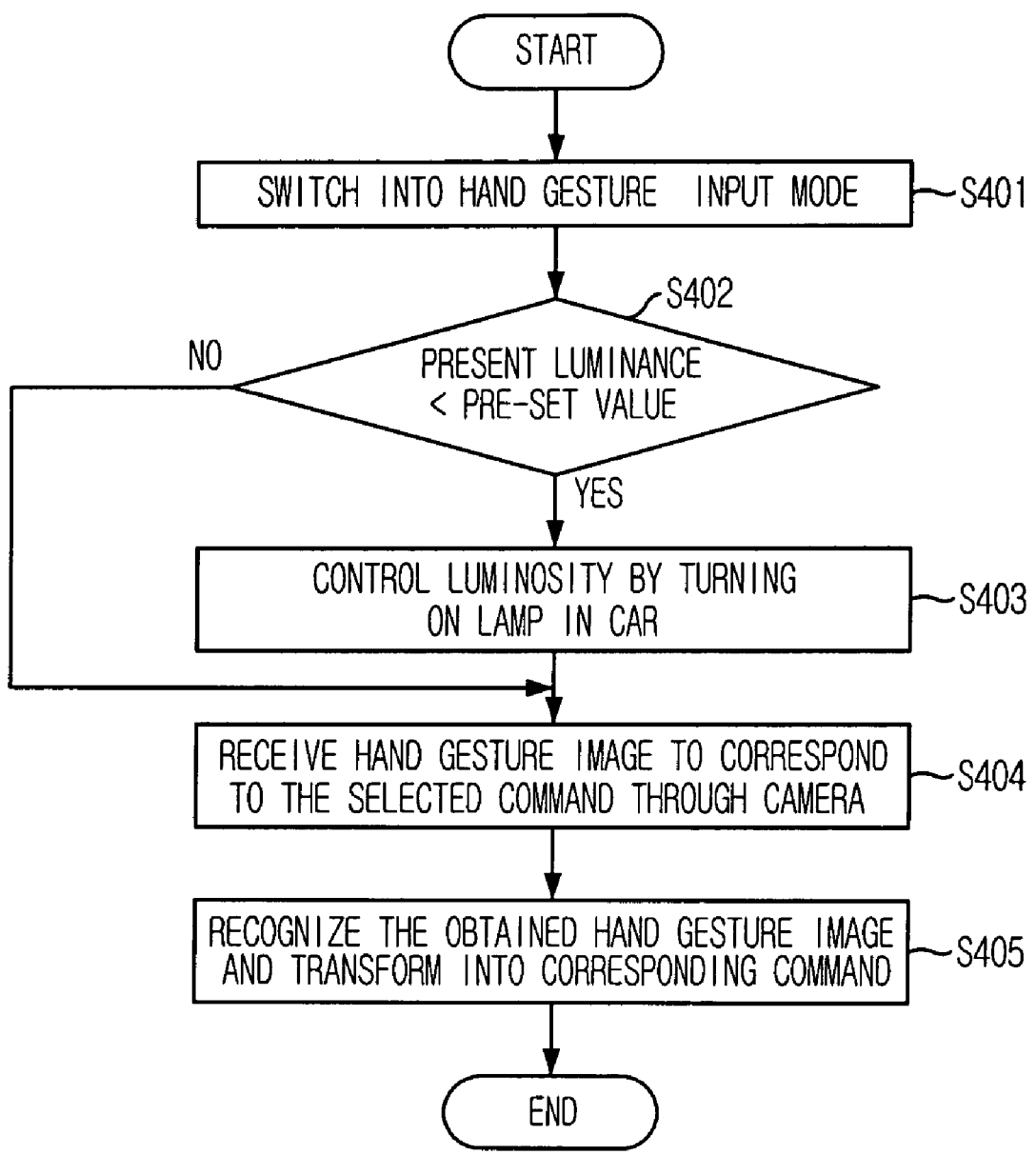
FIG. 4 is a flowchart illustrating a hand gesture recognizing process of a user interface using a hand gesture recognition in accordance with an embodiment of the present invention.

FIG. 4 is a flowchart illustrating a hand gesture recognizing process of a user interface using a hand gesture recognition in accordance with an embodiment of the present invention.

A hand gesture can be inputted by receiving a button input for entering a hand gesture input mode, or by analyzing camera input and if the camera input is a command for starting the hand gesture input, entering a hand gesture input mode. Herein, in case of switching into the hand gesture input mode, the start message is displayed in a monitor, sound is outputted from a speaker, and a timer is set up to process a command input time.

When the mode is set at the hand gesture input mode at step S401, it is checked if the present luminance is more than a pre-set degree, i.e., if luminosity is proper to recognize the hand gesture, at step S402. In the check result of the step S402, if the present luminance is less than the pre-set degree, the luminosity is controlled by turning on the lamp in the car, at step S403. Subsequently, at step S404, if the hand gesture image is recognized after analyzing the image obtained through the camera 11, it is transformed into a corresponding command. Also, the command announcement message which is pre-set with respect to a transformed command is outputted through the monitor and/or the speaker. At step 405, the obtained hand gesture image is recognized and transformed into corresponding command. For example, if a volume increase command is received continuously, a volume increase width is getting widen.

Meanwhile, if the command is processed normally, the timer is re-set up to maintain the hand gesture input mode. That is, the hand gesture input mode is continued until an end command is inputted or a timer is terminated, in order to process various commands using a hand gesture.

Figure 5:
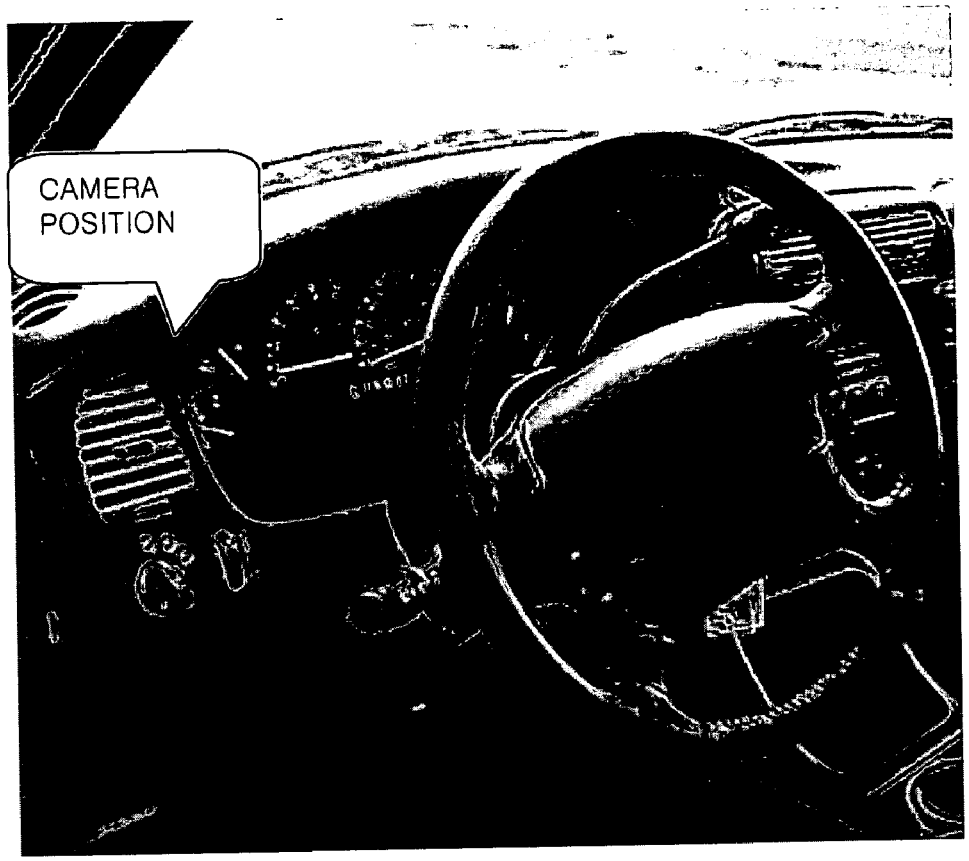
FIG. 5 is a photograph showing a position that a camera is mounted in a user interface device using a hand gesture recognition with an embodiment of the present invention.

As shown in FIG. 5, the camera 11 for obtaining the hand gesture image of the present invention is positioned near the lamp in consideration of the luminosity. In the position near the lamp, a body of a driver does not appear in the monitor, a light is not seen in a back seat when turning on the lamp and a focus is adjusted in a left upper part of a driver's seat, i.e., at a direction of 10 o'clock, which makes a driver capable of inputting a hand gesture easily with his left hand on a handle.

The present invention makes it possible to control a telematics terminal safely and comfortably while driving and operate easily at night that a dashboard is not seen well by recognizing a hand gesture image received through a camera in the telematics terminal as a corresponding control signal, which finally makes a driver keep concentrated on driving.

As described in detail, the present invention can be embodied as a program and stored in a computer-readable recording medium, such as CD-ROM, RAM, ROM, a floppy disk, a hard disk and a magneto-optical disk. Since the process can be easily implemented by those skilled in the art, further description will not be provided herein.

The present application contains object matter related to Korean patent application No. 2004-0108964, filed with the Korean Intellectual Property Office on Dec. 20, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An interface apparatus using a hand gesture recognition, comprising:
   an image obtaining means for acquiring a hand gesture image;
   an input receiving means for receiving a command registration request signal and a command selection signal;
   a hand gesture recognizing means for storing the hand gesture image, which is obtained in the image obtaining means according to the command registration request signal received in the input receiving means, in connection with a specific command, and transforming the hand gesture image into the corresponding command by recognizing the hand gesture image from the image obtained in the image obtaining means; and
   a command performing means for performing an operation corresponding to a command transformed in the hand gesture recognizing means.

2. The apparatus as recited in claim 1, further comprising:
   a luminance sensing means for sensing a luminance, transmitting the luminance to the command performing means and, if a luminance is less than a pre-set value, controlling a lamp to be turned on.

3. The apparatus as recited in claim 1, wherein the procedure that the hand gesture recognizing means registers the command by storing a user authentication information received from the receiving means, authenticating the user based on the stored authentication information when the command registration request signal is received in the input receiving means, and storing the hand gesture image obtained in the image obtaining means in connection with a specific command.

4. The apparatus as recited in claim 3, wherein the hand gesture recognizing means recognizes the hand gesture by separating a command input frame including the hand gesture that can be recognized as an independent command from the image obtained in the image obtaining means, recognizing the hand gesture by extracting feature points from the separated command input frame, and transforming the hand gesture into the corresponding command.

5. The apparatus as recited in claim 3, wherein the command is executed by outputting a command announcement message which is pre-set with respect to the command transformed in the hand gesture recognition means, and performing a corresponding operation.

6. An interface apparatus using a hand gesture recognition, comprising the steps of:
- a) outputting an available command list upon a command registration request signal, receiving a selection for a specific command, receiving a hand gesture image to correspond to the selected command, and registering the hand gesture image to a gesture information database (DB);
- b) recognizing the hand gesture image obtained from a camera and transforming the image into the corresponding command; and
- c) performing the operation corresponding to the transformed command.

7. The apparatus as recited in claim 6, further comprising the step of:
- d) controlling luminosity by turning a lamp on if a present luminance is less than a pre-set value.

8. The apparatus as recited in claim 6, wherein the step a) includes the steps of:
- a1) authenticating a user upon the command registration request signal if the user authentication is successful;
- a2) receiving the selection for the specific command by outputting the available command list;
- a3) obtaining the hand gesture image to correspond to the received command; and
- a4) extracting feature points by analyzing the obtained hand gesture image and storing the feature points.

9. The apparatus as recited in claim 8, wherein the step b) includes the steps of:
- b1) being switched into a hand gesture input mode;
- b2) separating a command input frame including the hand gesture that can be recognized as an independent command from the image which is obtained in the image obtaining means, and recognizing a hand gesture by extracting feature points from the separated command input frame; and
- b3) comparing the feature points of the hand gesture with the feature points of the hand gesture image which is pre-registered, and transforming the hand gesture image into a corresponding command.

10. The apparatus as recited in claim 8, wherein in the step c), the command announcement message which is pre-set with respect to the command transformed in the hand gesture recognition means is outputted and a corresponding operation is performed.

* * * * *